Feb. 9, 1943.  W. LEATHERS  2,310,300
REGISTER MECHANISM FOR INDICATING INSTRUMENTS
Filed Aug. 2, 1940
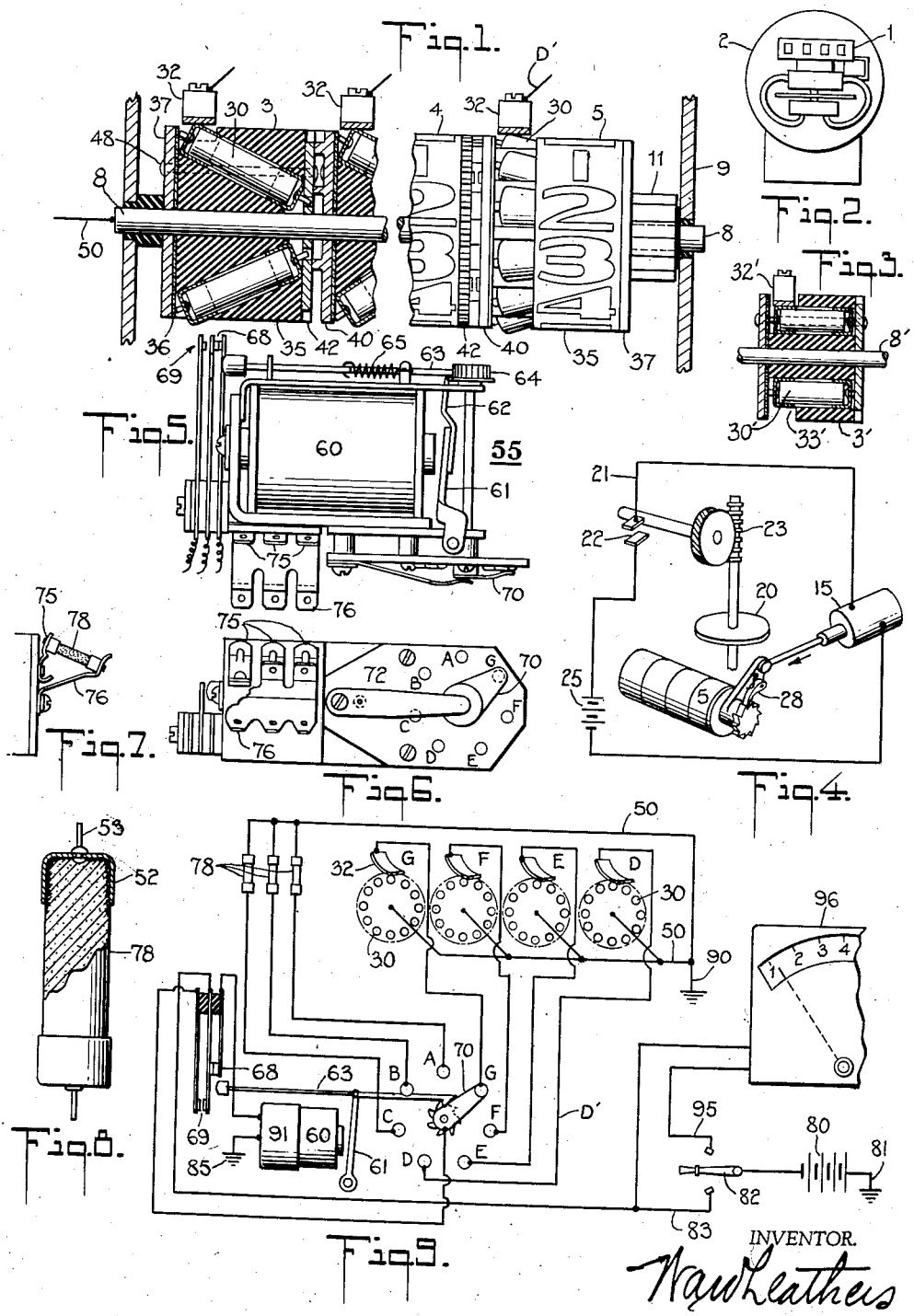
INVENTOR.
Wau Leathers Patented Feb. 9, 1943

2,310,300

UNITED STATES PATENT OFFICE 2,310,300

REGISTER MECHANISM FOR INDICATING INSTRUMENTS

Ward Leathers, Brooklyn, N. Y., assignor, by mesne assignments, to International Business Machines Corporation Application August 2, 1940, Serial No. 349,976

4 Claims. (Cl. 201—48)

My invention applies to the reading of remotely disposed meters, such as watt-hour, gas or water meters, where the same are joined to a central reading station by means of a wire.

Most consumers meters indicate the consumption on flat dials with continuous or progressive moving fingers. Many advantages, however, are obtained by having all figure indicators in the meter move intermittently from figure to figure for registering purposes. The present invention pertains to that type of reading unit commonly called a cyclometer. Distant reading is accomplished by measuring on a suitable measuring instrument the current in volts or amperes that pass through resistors of varying resistance values in the meter.

Among other objects of my invention is to produce small, compact, reliable resistance units so arranged that they may be wholly contained within the confines of present cyclometer or indicating units in present-day watt-hour meters.

A further object of the present invention is to produce means whereby a pulsing mechanism, such as a stepping switch, disposed in or near the meter, may permit the progressive reading, one at a time, of a series of said resistors over a wire and remove for purposes of accurate resistance reading the energizer or actuator of the pulsing device from the circuit at such time as the reading of the resistor is being made; in other words, a pulsing and reading mechanism whereby both functions are performed at the meter end from substantially the same current over the same wire without the slightest interference one with the other.

Further objects will appear as the invention is better understood.

In order to set forth my invention in clear and understandable terms, I have prepared the following specification and appended drawing thereto, of which:

Figure 1 is a fragmentary side elevational view, partly in section, of a cyclometer cylinder constructed in accordance with the principles of the present invention.

Figure 2 is a diagrammatic view of a meter showing the location of the cyclometer parts.

Figure 3 is a cross-sectional view showing a modification of a single cylinder of the cyclometer of Figure 1.

Figure 4 is a schematic, diagrammatic view of the mechanism for driving the recording cyclometer.

Figure 5 is a plan view of a pulsing mechanism.

Figure 6 is a side view of same.

Figure 7 is a side view of a resistor holder.

Figure 8 is a partially broken enlarged elevational view of a resistor.

Figure 9 is a schematic electric diagrammatic view of a complete meter-reading system.

A cyclometer or register 1 suitable for registering consumed watt-hours in a meter 2, Figure 2, or used for other registering purposes is composed of cylinders 3, 4 and 5, Figure 1. These cylinders are supported on shaft 8 having bearings in frame members 9 and 10. The initial or units cylinder 5 is driven in any suitable manner, such as by a rachet wheel 11.

This cyclometer is caused to register consumption of electric current, such as watt-hours in any suitable manner in one form of which I have used an auxiliary source of power, such as a solenoid 15, Figure 4. When the registering armature 20 in the meter closes an electric circuit 21 through electric contacts 22 by means of a worm drive 23, causing the contacts 22 to make contact each time one kilowatt hour is to be registered as consumed. Current from a suitable source, such as a battery 25, passes through the solenoid 15 causing the ratchet mechanism 28 to set-up the cylinder 5 one-tenth of a revolution. The battery shown at 25 is, of course, schematic. The current for operating the solenoid 15 would in preferred form be obtained from the power source present in the meter. When cylinder 5 jumps the tenth-tenth of a revolution it sets up cylinder 4 one-tenth of a revolution and the same is true with respect to cylinders 4 and 3, and so on to the number of cylinders desired by means common to all counting mechanisms.

Within each of the cylinders are cylindrically disposed ten electrical resistors 30 (the ends of which are clearly shown in Figure 9)—one being provided for each of the figures on the surface of the cylinder, i. e. one for each of the numerals 1—2—3—4—5—6—7—8—9—0. Each of these ten resistors has a different and indicative resistance value. The cylinders are similar. The resistors project circumferentially at one end of the cylinder in such circumferential alignment that they may be made to contact an electrical brush 32 suitably insulated from and held by the frame of the cyclometer. The resistors in each cylinder may lie with their axes in a conic section, the axis of the cone coinciding with that of the cylinder. The main portion 35 of the cylinder 3 is moulded of insulation material and an insulating disc 36 is interposed between this moulded portion and a metallic disc on the portion 37. A metallic disc or portion 40 on the resistance portion 35 of the cylinder 5 is suitably designed to carry its set-up motion to a metallic gear 42 on the cylinder 4. The metal portions 37, 40 and 42 are held to the moulded portions by means of rivets 43. The resistors 30, at one end, come in contact with the brushes 32 in their rotative travel. At their other end they are in constant electrical contact with the metallic disc 42. The discs 40 and 42 are in electrical contact with the shaft 8 to which an electric circuit is joined in suitable manner as at 50.

The resistors 30, see Figure 8, are made of carbon and adhesive. They are commonly made by moulding carbon particles and phenolic resin together. Since one element is conductive and the other element resistive, their relative proportions give varying resistance values. These moulded resistors have metallic caps 52, Figure 8, tightly joined to them. The caps are provided with wire projections 53. These resistors may be dipped, plated or coated, or otherwise sealed in such manner that they will be quite impervious to atmospheric changes.

For telelector purposes, that is for reading this recording cyclometer from a remote location by means of a wire, it is necessary to ascertain the number on the register by determining which of the resistances in any particular cylinder 3, 4, 5 is in contact with the brush 32 and it is necessary to determine these resistances one at a time for each of the several cylinders, such as units, tens, hundreds, thousands. In order that these cylinders may be so read one at a time in a proper sequence I have found it essential to provide in or near the meter a phasing unit, generally characterized by the numeral 55, and shown in Figures 5, 6 and 9. In the phasing unit 55 an electro-magnet 60 when energized actuates an armature 61 to which is joined an extension arm 62 which engages a ratchet pawl 63 which in turn rotates a ratchet wheel 64 one-seventh revolution with each actuation. A spring 65 returns the armature by means of the pawl 63 to the position shown. When the pawl 63 is moved by the armature it also actuates an electric break 68 and electric make 69. The ratchet wheel 64 causes the rotation of a distributor arm 70 which distributes current through contacts A, B, C, D, E, F, and G disposed in a piece of insulation material 72. On the side of the phasing or distributing unit 55 there is a bracket composed of three parts 75 and one part 76 constructed to hold three resistors 78 in a manner shown in Figure 7, and with the bracket 76 being common to all three. The resistors 78 are used for indicating the number of the cyclometer itself. This number may indicate the account number of the consumer or may in other manner determine the place of location of the meter being read. In order to make clear exactly how these resistors 78, being identical with the resistors 30, are used for meter identifying and meter reading purposes I have provided a diagram, Figure 9, wherein current from any suitable source, such as a battery 80 having one pole grounded at 81 is supplied by means of a switch 82 to a line 83 which by means of the contacts 68 leads the current through the coil 60 to ground at 85 from which return is made to the ground 81. When the coil 60 is energized and the armature 61 is actuated the pawl or ratchet arm 63 breaks the circuit at 68. It simultaneously establishes a circuit at 69 which is then carried to the distributor arm 70. From 70 it is progressively distributed through A, B and C to the resistors 78 and through D, E, F and G to the brushes 32, the resistors 30, the common 50 and the ground 90. When the coil 60 is energized the brush 70 jumps to position A at which time a delay action caused by a copper jacket 91 holds the armature 61 a predetermined time, during which interval contact 69 is closed. During such closure of the contact 69, by means of the switch 82 and the line 95, current from the battery 80 may be manually shunted through a volt-meter or other measuring electrical instrument 96 by means of which the particular type of resistor, that is, the resistor with a particular resistance value, which is at that moment in the line may be measured or determined, thereby making the identifying and reading of the meter possible on the dial of the instrument 96. When 91 ceases to hold the armature at 61 the entire sub-cycle just described may be repeated, and when repeated seven times gives the full information concerning the meter as above described.

Resistors 30′, Figure 3, may be disposed within the cylinder 3′ with their axes in cylindrical arrangement. In which case, the brush 32′ makes contact with the ends of the resistors by means of a cut-away portion at the end of the cylinder 3′.

What is claimed is:

1. A cyclometer wheel for registering meters comprising a substantially solid rotatable cylindrical body formed of insulating material and having a plurality of value-representing indicia on the outer cylindrical surface thereof, a plurality of resistors corresponding in number to the number of said indicia and having different electrical resistance values which are correlated with the values represented by said indicia, said resistors being embedded in the body in spaced relationship with respect to each other and contained substantially wholly within the cylindrical confines thereof, said resistors being adapted for successive introduction into a reading circuit, a small limited portion of each resistor being exposed adjacent the cylindrical surface of the body and accessible for electrical connection in the circuit, said exposed portions occupying positions at the cylindrical surface in a common plane normal to the longitudinal axis of the body.

2. A cyclometer wheel for registering meters comprising a cylindrical body formed of insulating material and having a plurality of indicia on the outer cylindrical surface thereof, a plurality of resistors of different electrical resistance values and commensurate with the number of indicia on said surface embedded in the body and contained substantially wholly within the cylindrical confines thereof, said resistors being adapted for successive introduction into a reading circuit, a limited portion of each resistor being exposed at the cylindrical surface of the body and accessible for electrical connection in the circuit, the axes of said cylindrical resistors lying substantially on the surface of a conic section whose axis coincides with the axis of the cyclometer wheel.

3. A cyclometer wheel for registering meters comprising a cylindrical body formed of insulating material, a plurality of resistors having cylindrical bodies and metallic end caps telescopically received over the ends thereof, said resistors having different resistance values, said resistors being embedded within the cylindrical cyclometer wheel body in spaced relation and contained substantially within the cylindrical confines thereof, the axes of said cylindrical resistor bodies lying substantially on the surface of a transverse conic section whose axis coincides with the axis of the cyclometer wheel, a limited portion of the outer circumferential edge of one end cap of each resistor being exposed at the surface of the cylindrical body of the cyclometer wheel for accessibility in connecting the same in a reading circuit.

4. A cyclometer construction for registering meters including a plurality of substantially solid rotatable cylindrical bodies formed of insulating material and capable of assuming respective angular positions corresponding to the volume consumption of a metered product, a plurality of resistors embedded in each cylindrical body in spaced relationship with respect to each other and contained substantially wholly within the cylindrical confines thereof, said resistors having electrical values which are correlated with the different positions capable of being assumed by the respective members in which they are embedded, a small limited portion of each resistor being exposed adjacent the surface of its respective body, the exposed portions of said resistors of each cylindrical body occupying positions in a common plane normal to the longitudinal axis of the body, and an electrical brush positioned in the path of movement of each series of exposed portions for successive separate engagement therewith.

WARD LEATHERS.